United States Patent
Braun

(10) Patent No.: US 6,225,721 B1
(45) Date of Patent: May 1, 2001

(54) SELF-CENTERING TIMING DISK HUB AND METHOD OF MOUNTING THE SAME

(75) Inventor: Paul-Wilhelm Braun, Troisdorf (DE)

(73) Assignee: PWB-Ruhlatec Industrieprodukte GmbH, Seebach (DE)

( * ) Notice: Subject to any disclaimer, the term of this patent is extended or adjusted under 35 U.S.C. 154(b) by 0 days.

(21) Appl. No.: 09/471,824

(22) Filed: Dec. 23, 1999

(30) Foreign Application Priority Data

Dec. 23, 1998 (DE) .................................... 198 60 012

(51) Int. Cl.⁷ ............................. H02K 5/00; F04D 29/26
(52) U.S. Cl. ............................................. 310/91; 310/67 R
(58) Field of Search ............................. 310/91, 42, 67 R, 310/89, 90, 261; 250/231.13, 239

(56) References Cited

U.S. PATENT DOCUMENTS

| 4,188,828 | * | 2/1980 | Cucolini | ................................. 73/460 |
| 5,859,425 | | 1/1999 | Mleinek et al. | ................ 200/231.13 |

FOREIGN PATENT DOCUMENTS

| 0 468 147 A2 | 1/1992 | (EP) | ............................... F04D/29/26 |
| 121455 | 8/1971 | (GB) . | |

* cited by examiner

Primary Examiner—Tran Nguyen
(74) Attorney, Agent, or Firm—Darby & Darby

(57) ABSTRACT

The invention relates to a self-centering timing disk hub with a timing disk support surface and a tubular hub sleeve, wherein the end of the hub sleeve can be pushed onto a motor shaft so as to provide in the hub sleeve a contact surface between the inner wall surface of the hub sleeve and the motor shaft. The outer wall surface of the hub sleeve has an at least approximately conical form, wherein the cone angle opens from the sleeve end to the timing disk support surface. The hub sleeve is slotted at least in the region of the motor shaft and a clamping element is movably arranged on the outer wall surface at the sleeve end.

The invention also relates to a method for mounting a self-centering timing disk hub on a shaft, in particular a motor shaft of an encoder.

11 Claims, 2 Drawing Sheets

SELF-CENTERING TIMING DISK HUB AND METHOD OF MOUNTING THE SAME

BACKGROUND OF THE INVENTION

1. Field of the Invention

The present invention relates to a self-centering timing disk hub with a timing disk support surface (1a) and a tubular hub sleeve (1b) and to a method for mounting the same on a motor shaft.

2. Description of the Related Art

Self-centering timing disks of the afore described type are known from DE 196 41 929 A1 (RUHLATEC Industrieprodukte GmbH). The timing disk hub described therein is installed in an encoder which is connected with a motor by a simple rotational motion.

Sufficient clearance should be provided for centering the timing disk hub on the motor shaft during installation. For this reason, the end of the timing disk hub facing the motor has a pilot bore for aligning the vertical axes of the shaft and the timing disk. With current state-of-the-art devices, a distortion tended to occur when the shaft is inserted into the timing disk hub, since the hub which is pushed onto the finish-machined shaft, has a reduced diameter. A housing surface exerts an axial pressure on the timing disk support surface, thereby moving the timing disk support surface and the timing disk hub connected thereto into the proper position for a centered placement in the encoder housing.

Such timing disks are used in an increasing number of applications and produced in large quantities. The stringent requirements on the surface quality of the motor shaft and the timing disk hub as well as the tight manufacturing tolerances create a cost pressure in mass production. It is also difficult to maintain the required tolerances in production. A slight displacement of the timing disk relative to the motor shaft can adversely affect the operation of, for example, servo motors. Manufacturing tolerances can have a significant effect due to the large forces applied during the pressing process.

SUMMARY OF THE INVENTION

It is therefore an object of the present invention to provide a self-centering timing disk hub which can be placed, and adjusted without pre-tension and secured on a motor shaft. It should be possible to install the timing disk hub installation in mass production, while maintaining the accuracy required for encoders.

According to the invention, a self-centering timing disk hub with a timing disk support surface and a tubular hub sleeve is provided. The sleeve end is being pushed onto a motor shaft with a contact surface being produced in the hub sleeve between the inner wall surface of the hub sleeve and the motor shaft. The outer wall surface of the hub sleeve is at least partially formed in the shape of a cone. The cone angle opens from the sleeve end to the timing disk support surface. The hub sleeve is slotted at least in the region of the motor shaft. A clamping element is movably arranged on the outer wall surface of the sleeve end. Further the cone angle is in the range of 10–15° and the length of the at least one slot in the hub sleeve is in the range of 0.5–0.8 of the contact surface length between the hub sleeve and the motor shaft. The hub sleeve includes a stop face which defines the rest position of the clamping element, with the stop face located on the outer wall surface in a region of the open end of the slot. Further, the clamping element includes a clamping ring and may be manufactured of an elastic plastic material.

The at least one slot in the hub sleeve has a width of about 1–2 mm. In the first third of the hub sleeve, viewed from the side of the motor shaft, a locking face defining the tensioning position of the clamping element is machined circumferentially on the outer wall surface of the hub sleeve. The locking face has a protruding lip, disposed on the outer circumference of the hub sleeve. On the sleeve end on the side of the motor shaft, the inner wall surface of the hub sleeve has a conical enlargement. The conical enlargement on the inner wall surface of the hub sleeve extends from the end face over a range of 20% of the length of the hub sleeve. Preferably there are at least 4 slots within the hub sleeve of axis-parallel extension equally distributed on the circumference.

In addition, a method for mounting a self-centering timing disk hub on a shaft, in particular, a motor shaft of an encoder, is provided. The timing disk hub includes a timing disk support surface and a tubular hub sleeve, with the sleeve end of the hub sleeve oriented towards the motor shaft and the end of the timing disk hub facing the motor shaft is slotted with a clamping ring being pushed onto the slotted end. The clamping ring is then moved from a tension-relieved position into a tensioned position after the timing disk hub is shifted onto the motor shaft.

It has been observed that a timing disk hub formed according to the invention can be pushed onto the motor shaft and clamped at the time of installation, without displacing the timing disk axis radially or angularly relative to the motor shaft axis. Since during installation this does not produce a press-fit, only a relatively small force is required. Instead, the hub and the shaft slide relative to each other during installation and are changed to each thereafter only.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The invention will be described hereinafter in more detail with reference to several embodiments.

DETAILED DESCRIPTION OF THE PRESENTLY PREFERRED EMBODIMENTS

Figure 1:
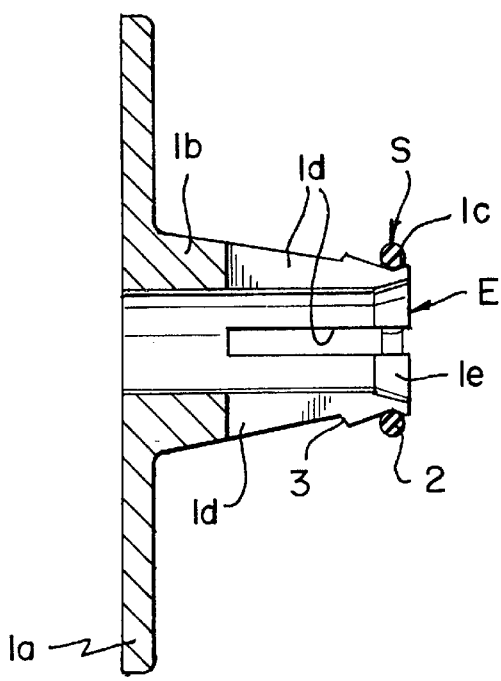
FIG. 1 is a cross-section through a timing disk hub according to the invention before installation.

FIG. 1 shows a cross-sectional view of a timing disk hub according to the invention with a timing disk support surface 1a and a tubular hub sleeve 1b. As seen from FIG. 1, the outer wall surface of the hub sleeve 1b has a conical form, with the cone angle opening from the sleeve end E to the timing disk support surface 1a. Slots 1d are formed in the hub sleeve which extend into the contact region with the motor shaft W (FIG. 2).

A stop face 1c which reliably secures a clamping element S in the rest position before installation, is formed at the end of the hub sleeve 1b. The clamping element S preferably includes a clamping ring 2 which in its rest position is not pre-tensioned, but is placed loosely on the outer wall surface of the sleeve end.

Figure 2:
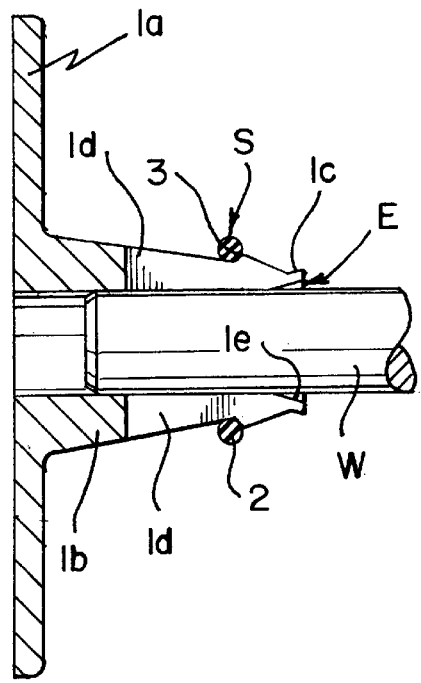
FIG. 2 is a cross-section through a timing disk hub according to the invention after installation on a motor shaft.

FIG. 2 shows a timing disk hub according to the invention after installation on the motor shaft W. As seen in FIG. 2, the clamping ring 2 has moved to a tensioning position on the conical outer wall surface of the hub sleeve 1b. The clamping ring 2 is retained in the displaced position (tensioning position) on a locking face 3 to provide in this position a non-slip, force-transmitting connection between the motor shaft and the timing disk hub.

Figure 3:
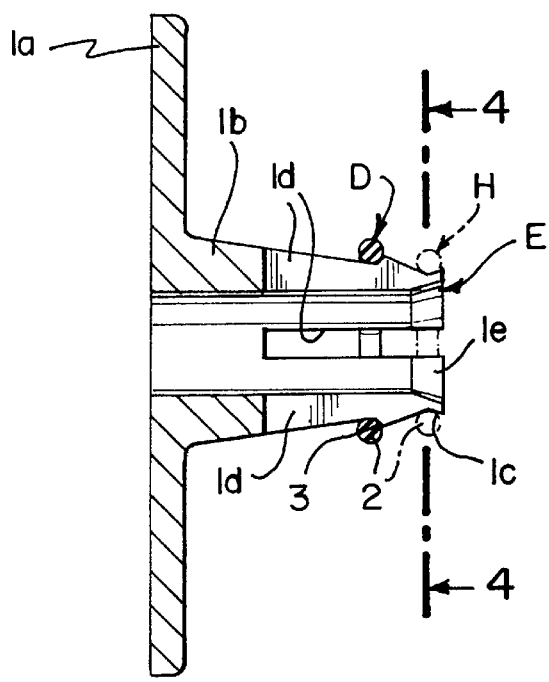
FIG. 3 is a schematic diagram describing the installation process.
Figure 4:
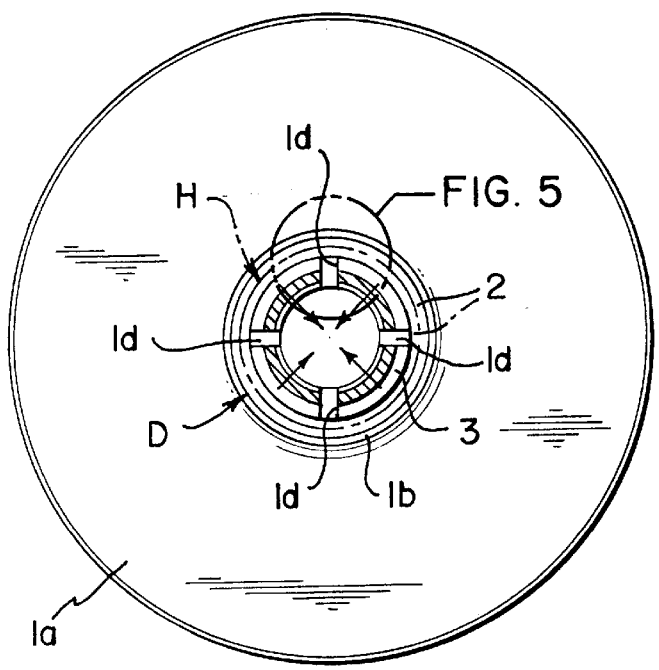
FIG. 4 is a view BB according to FIG. 3 from the side of the motor shaft connection.

FIG. 3 schematically illustrates the installation process. After the timing disk hub 1b is pushed onto a motor shaft W, the clamping ring 2 is moved from its forward position onto the cone, thereby clamping the motor shaft W. Since the shaft is made of plastic—preferably of the type ABS—a small tensioning force is sufficient to reliably secure the timing disk on the motor shaft W. This situation is illustrated in FIG. 4 which shows a front view, as viewed from the side of the motor shaft.

The width of the slots is preferably greater than the wall thickness of the tubular timing disk hub. A relatively elastic body which can be placed in intimate contact with the shaft W by applying only a small external pressure, is formed by providing at least four slots which are distributed uniformly over the tubular circumference of the timing hub. FIG. 4 indicates the displacement of the clamping ring from the rest position (lightly shaded area H) into the tensioning position (dark area D). According to a preferred embodiment, the clamping ring can be made of rubber. The clamping forces act on the motor shaft radially in the direction of the arrows.

Figure 5:
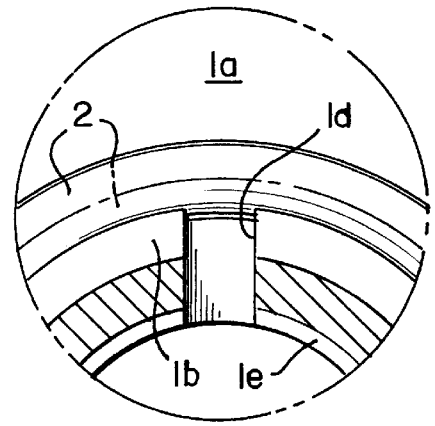
FIG. 5 shows an enlarged section A of FIG. 4.

In both positions, the clamping ring should be held securely on the timing disk hub. As seen from the enlarged section A of FIG. 5, the lip 1c safely retains the clamping ring in the rest position on the hub. A conical enlargement 1c is provided at the output end E of the timing disk hub of the invention, with the conical enlargement serving as a catch bore for the motor shaft.

Figure 6:
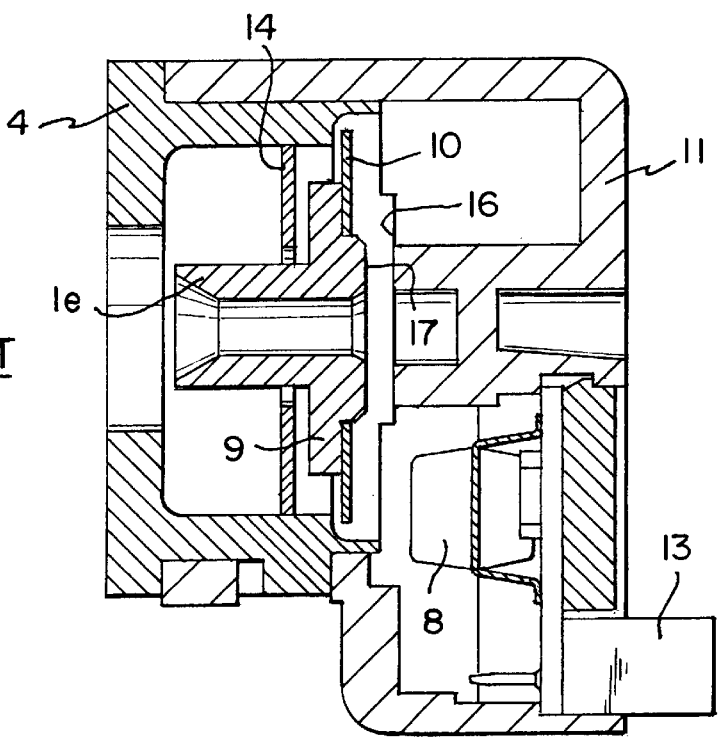
FIG. 6 is a pre installed housing according to DE 196 41 921 A1.

A cross-sectional view through an encoder before installation is illustrated in FIG. 6 to serve as a comparison with a conventional timing disk and to explain the installation. A base plate 4 of an encoder housing 11 which is flange-mounted against the motor side, is shown.

A timing disk 10 is arranged on the hub 9. A locking ring 14 prevents the timing disk 10 from falling out before installation. A centering surface 17, which cooperates with the guide surface of the housing 16 for automatically centering the hub 9, is formed on one end of the hub 9. A sensor unit 8 with a terminal strip 13 is arranged next to the centering surface 17. A conventional encoder unit can also be used with the present invention if the timing disk hub 9 is exchanged for a timing disk hub constructed according to the invention.

It has been experimentally observed that the timing disk axis can be exactly aligned with the motor shaft axis using the installation method of the invention. Only a small force is required for the installation, so that no bending stress should be transmitted to the timing disk. The design of the locking positions for the safety ring guarantees a permanent attachment of the timing disk on the timing disk hub. Experiments with different materials have further demonstrated that timing disks produced according to the invention fit snugly on the motor shaft even if the surface quality of the motor shaft is degraded. As a result, the manufacturing costs can be reduced even further without affecting the manufacturing quality.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A self-centering timing disk hub comprising:
   a tubular hub sleeve having an inner wall surface, an outer wall surface and a sleeve end;
   a clamping element movably arranged on the outer wall surface;
   a support surface;
   the tubular hub sleeve terminating in the support surface;
   the sleeve end being formed to receive a motor shaft;
   a contact surface being formed between the inner wall surface and the motor shaft;
   the outer wall surface being at least partially cone-shaped and forming a cone angle which opens in a direction extending from the sleeve end towards the support surface;
   the hub sleeve including at least one slot extending axially inward from the sleeve end;
   wherein the cone angle is in the range of about 10–15°;
   wherein the at least one slot in the hub sleeve extends in length over one half to 0.8 of the length of the contact surface formed between the hub sleeve and the motor shaft; and wherein the hub sleeve includes a stop face defining a rest position of the clamping element, the stop face being located on the outer wall surface in a region of the sleeve end.

2. The self-centering timing disk hub according to claim 1, wherein the clamping element comprises a clamping ring.

3. The self-centering timing disk hub according to claim 2, wherein the clamping element is made of an elastic plastic material.

4. The self-centering timing disk hub according to claim 3, wherein the at least one slot has a width in the range of about 1–2 mm.

5. The self-centering timing disk hub according to claim 4, wherein in the first third of length of the hub sleeve, as viewed from the end of the motor shaft, a locking face defining the tensioning position of the clamping element is machined on the outer wall surface of the hub sleeve.

6. The self-centering timing disk hub according to claim 5, wherein the locking face has a circumferentially protruding lip disposed on the outer wall surface of the hub sleeve.

7. The self-centering timing disk hub according to claim 6, wherein on the sleeve end on the end of the motor shaft, the inner wall surface of the hub sleeve has a conical enlargement.

8. The self-centering timing disk hub according to claim 7, wherein the conical enlargement on the inner wall surface of the hub sleeve extends over into a region of about 20% of the length of the hub sleeve from the end thereof.

9. A self-centering timing disk hub comprising:
 a tubular hub sleeve having an inner wall surface, an outer wall surface and a sleeve end;
 a clamping element movably arranged on the outer wall surface;
 a support surface;
 the tubular hub sleeve terminating in the support surface;
 the sleeve end being formed to receive a motor shaft;
 a contact surface being formed between the inner wall surface and the motor shaft;
 the outer wall surface being at least partially cone-shaped and forming a cone angle which opens in a direction extending from the sleeve end towards the support surface;
 the hub sleeve including at least one slot extending axially inward from the sleeve end.

10. The self-centering timing disk hub according to claim 9, wherein the cone angle is in the range of about 10–15°.

11. The self-centering timing disk hub according to claim 10, wherein the at least one slot in the hub sleeve extends in length over about half-0.8 of the length of the contact surface.

* * * * *